US012262718B2

(12) United States Patent
Schjerven, Sr. et al.

(10) Patent No.: US 12,262,718 B2
(45) Date of Patent: Apr. 1, 2025

(54) POWER MODULATOR FOR INFRARED CONVEYOR OVEN

(71) Applicant: THE MIDDLEBY CORPORATION, Elgin, IL (US)

(72) Inventors: William S. Schjerven, Sr., Schaumburg, IL (US); James Jeffery Hanson, Elgin, IL (US); Ricky Joe Sullivan McIntosh, Altoona, IA (US)

(73) Assignee: THE MIDDLEBY CORPORATION, Elgin, IL (US)

( * ) Notice: Subject to any disclaimer, the term of this patent is extended or adjusted under 35 U.S.C. 154(b) by 0 days.

(21) Appl. No.: 18/455,991

(22) Filed: Aug. 25, 2023

(65) Prior Publication Data

US 2023/0404085 A1 Dec. 21, 2023

Related U.S. Application Data

(63) Continuation of application No. 17/190,244, filed on Mar. 2, 2021, now Pat. No. 11,771,096, which is a continuation of application No. 14/710,841, filed on May 13, 2015, now abandoned.

(51) Int. Cl.
*A21B 1/40* (2006.01)
*A21B 1/22* (2006.01)
*A21B 1/48* (2006.01)
*H05B 1/02* (2006.01)

(52) U.S. Cl.
CPC ............. *A21B 1/40* (2013.01); *A21B 1/22* (2013.01); *A21B 1/48* (2013.01); *H05B 1/0263* (2013.01)

(58) Field of Classification Search
CPC ........... H05B 1/0263; A21B 1/48; A21B 1/22; A21B 1/40
See application file for complete search history.

(56) References Cited

U.S. PATENT DOCUMENTS

| 5,197,375 A | 3/1993 | Rosenbrock et al. |
| 2013/0306620 A1* | 11/2013 | Halloran ................ G05D 23/19 |
| | | 219/486 |
| 2015/0245623 A1* | 9/2015 | Schjerven, Sr. ......... H02H 3/05 |
| | | 219/510 |

FOREIGN PATENT DOCUMENTS

WO 2013138410 A1 9/2013

* cited by examiner

*Primary Examiner* — Dana Ross
*Assistant Examiner* — Kuangyue Chen
(74) *Attorney, Agent, or Firm* — Michael Best & Friedrich LLP

(57) ABSTRACT

A system and method to control the power supplied to heating elements of a conveyor oven. The conveyor oven includes a plurality of heating elements to evenly distribute heat in an oven compartment. During peak-loads, the current draw of the heating elements may exceed available power of a power supply. Therefore, a system and method to reduce the total current draw of the plurality of heating elements is provided. The system includes a controller configured to perform the methods disclosed herein. The methods effectively lower the total current draw by rapidly cycling a plurality of relays connected to each of the plurality of heating elements to achieve even distribution of heat and reduced current draw during peak-loads.

20 Claims, 9 Drawing Sheets

POWER MODULATOR FOR INFRARED CONVEYOR OVEN

RELATED APPLICATIONS

This application is a continuation of U.S. patent application Ser. No. 17/190,244, filed Mar. 2, 2021, which is a continuation of U.S. patent application Ser. No. 14/710,841, filed May 13, 2015, the entire contents of which are incorporated by reference herein.

BACKGROUND

Embodiments of the invention relate to power and control systems for conveyor ovens.

A conveyor oven often includes multiple heating elements positioned in an oven compartment and a conveyor that passes through the oven compartment.

SUMMARY

During peak-loads, for example, on a cold startup of the conveyor oven, the current draw of the heating elements may exceed the available power of a power supply. Therefore, a conveyor oven and a method for controlling a conveyor oven that controls the current draw during peak-loads are desirable.

In one embodiment, the invention provides a conveyor oven including an oven compartment with a conveyor extending through the oven compartment and a motor that drives the conveyor. The conveyor oven includes a first heating element and a first relay that controls the current flow to the first heating element. A power input module receives external power and distributes power to components within the conveyor oven. A controller includes an input/output module, a user interface, and a memory that stores instructions for the controller. The controller is configured to receive an input control signal from the user interface. The input control signal may represent a temperature setpoint for the oven compartment. The controller is also configured to send a heating element control signal to the first relay based on the input control signal. The heating element control signal is pulsed such that the first relay is repeatedly actuated to reduce an average current to the first heating element.

In another embodiment, the invention provides a conveyor oven including a first heating element, a second heating element, and a third heating element connected to a first relay, a second relay, and a third relay respectively. The conveyor oven includes a controller configured to actuate the first relay, the second relay, and the third relay such that the second heating element and the third heating element are energized for a first period of time during which the first heating element is de-energized. The controller actuates the second relay to de-energize the second heating element for a second period of time. Next, the controller actuates the first relay to energize the first heating element for a third period of time. The controller actuates the third relay to de-energize the third heating element for a fourth period of time, and actuates the second relay to energize the second heating element for a fourth period of time. The controller then actuates the first relay to de-energize the first heating element for a fifth period of time, and lastly, actuates the third relay to energize the third heating element for a sixth period of time.

In another embodiment, the invention provides a conveyor oven including a first heating element, a second heating element, a third heating element, and a fourth heating element connected to a first relay, a second relay, a third relay, and a fourth relay respectively. The conveyor oven includes a controller configured to actuate the first relay, the second relay, the third relay, and the fourth relay such that the second heating element, the third heating element, and the fourth heating element are energized for a first period of time during which the first heating element is de-energized. The controller is configured to perform the following steps. The controller actuates the second relay to de-energize the second heating element for a second period of time. The controller actuates the first relay to energize the first heating element for a third period of time. The controller actuates the third relay to de-energize the third heating element for a fourth period of time. The controller actuates the second relay to energize the second heating element for a fourth period of time. The controller actuates the fourth relay to de-energize the fourth heating element for a fifth period of time. The controller actuates the third relay to energize the third heating element for a sixth period of time. The controller actuates the first relay to de-energize the first heating element for a seventh period of time. Lastly, the controller actuates the fourth relay to energize the fourth heating element. The controller is configured to repeat the above-listed steps until the controller determines that the oven compartment is at a desired temperature setpoint.

In another embodiment, the invention provides a method for controlling a conveyor oven including a first heating element, a second heating element, and a third heating element. A first relay is connected to the first heating element, a second relay is connected to the second heating element, and a third relay is connected to the third heating element. A controller operates the relays by actuating the first relay, the second relay, and the third relay such that the second heating element and the third heating element are energized for a first period of time while the first heating element is de-energized. The controller actuates the second relay to de-energize the second heating element for a second period of time. Next, the controller actuates the first relay to energize the first heating element for a third period of time. The controller actuates the third relay to de-energize the third heating element for a fourth period of time, and actuates the second relay to energize the second heating element for a fourth period of time. The controller then actuates the first relay to de-energize the first heating element for a fifth period of time, and lastly, actuates the third relay to energize the third heating element for a sixth period of time. The controller is configured to repeat the above-listed steps until the controller determines that the oven compartment is at a desired temperature setpoint.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "controllers" described in the specification can include one or more processors, one or more memory modules including non-transitory computer-readable medium, one or more user interfaces, and various connectors connecting the components.

Figure 1:
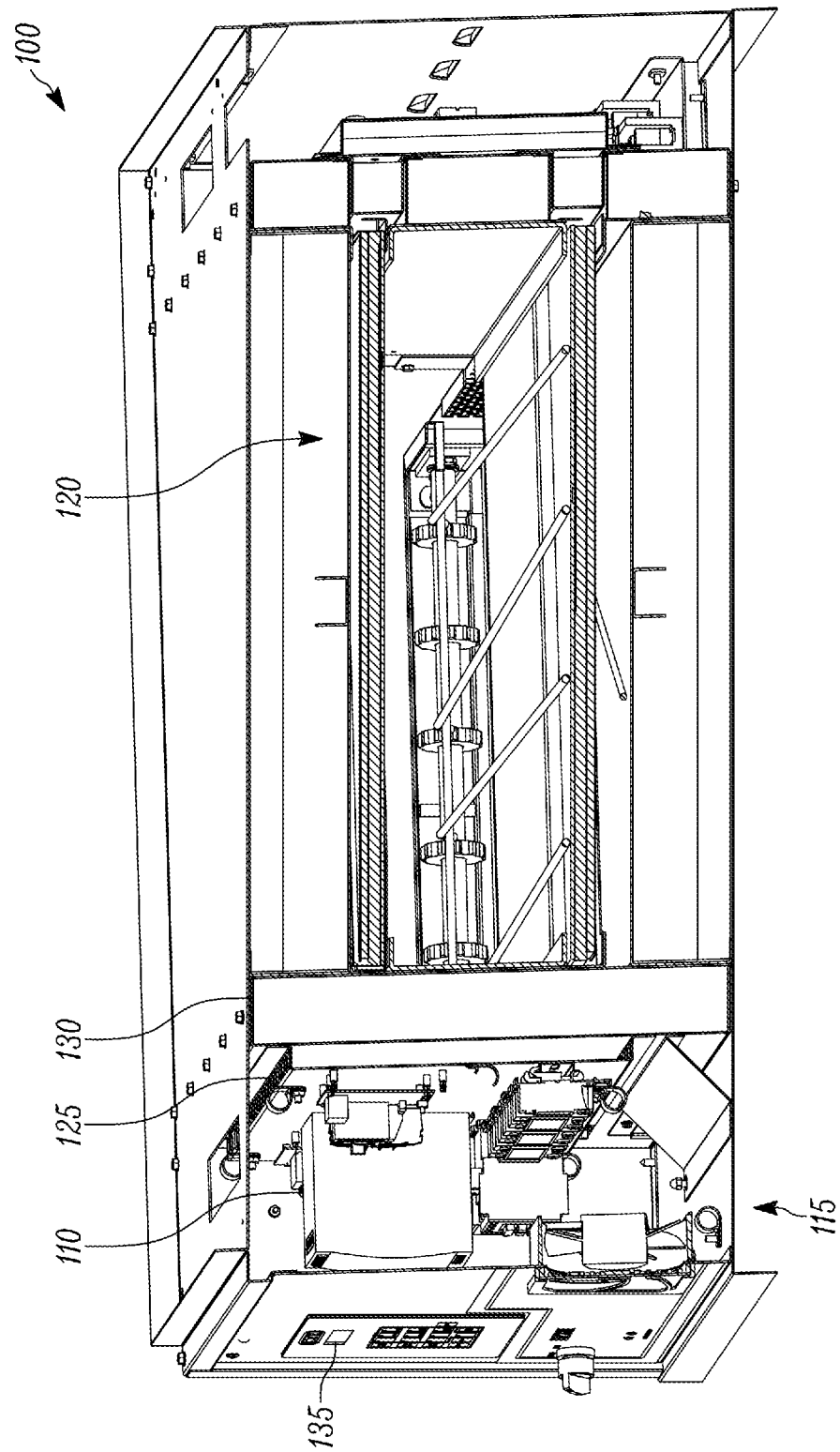
FIG. 1 is a sectional view of a conveyor oven.

FIG. 1 is a sectional view of an exemplary conveyor oven 100. In the illustrated embodiment, the controller 110 is located in a control cabinet 115 adjacent to an oven compartment 120. The controller 110 and various electrical components are mounted to a frame 125 on an interior portion of the control cabinet 115. The frame 125 is connected to an insulated panel 130, which separates the oven compartment 120 from the control cabinet 115. The controller 110 is electrically connected to components within the control cabinet 115. The components may include, for example, circuit breakers, fuses, transformers, cooling fans, manual switches, and conveyor controls. A user interface 135 is connected to the controller 110. The oven compartment 120 includes a conveyor 140 that transports items through the conveyor oven 100.

Figure 2:
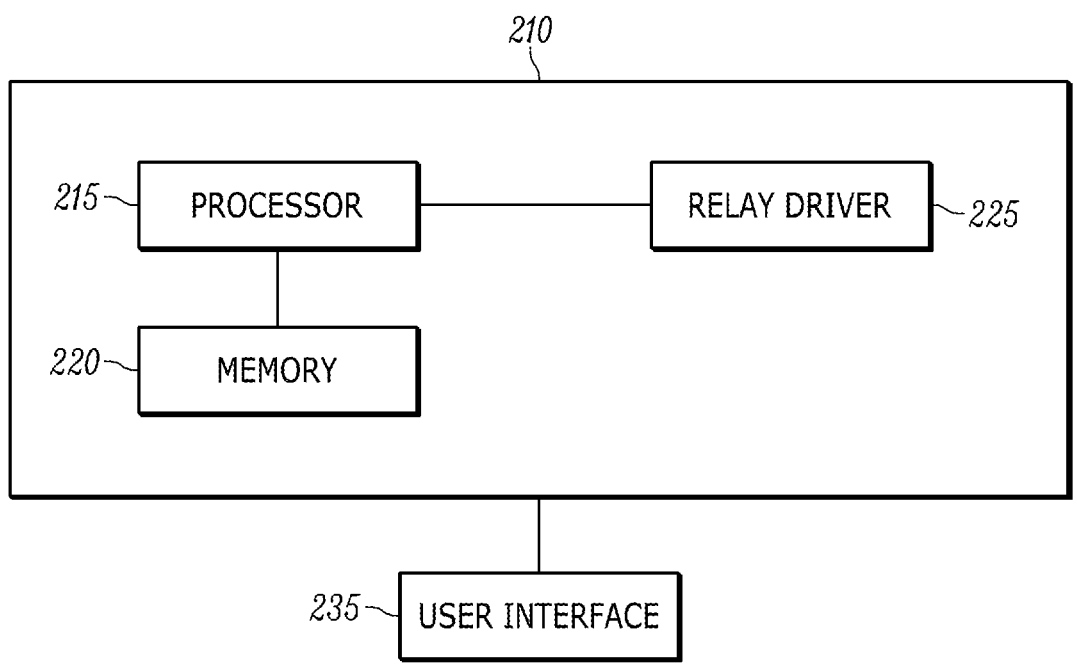
FIG. 2 is a block diagram of a controller of the conveyor oven of FIG. 1.

One embodiment of the conveyor oven 100 is illustrated in FIG. 2. The controller 110 includes a processor 215, a memory 220, a relay driver 225, and a user interface 235. The processor 215 is electrically connected to a number of modules or components of the controller 210. For example, the processor 215 is connected to the memory 220, the user interface 235, and the relay driver 225. The controller 110 includes combinations of hardware and software that are operable to control the operation of the conveyor oven 100. In addition, the controller 110 includes a plurality of electrical and electronic components that provide power, operational control, and protection to the components and modules within the controller 110 and/or within the control cabinet 115.

The user interface 235 may include a graphical user interface or other input/output device that enables an operator to control and configure the controller 110 and that enables the controller 110 to present an output to the user. The user interface 235 may be located externally to the controller 110 or be integrated with the controller 110. For example, the user interface 235 may be mounted on an exterior surface of the control cabinet 115 for ease of access by an operator. The user interface 235 allows an operator to adjust the temperature setting of each individual heating zone and to set the conveyor speed. Temperature setpoints and conveyor speed setpoints may be programed and saved as multiple presets. Presets allow an operator to recall the temperature setpoints and conveyor speed setpoints with a single button on the user interface 235. The user interface 235 displays messages to the operator including, for example, an active preset, a time and date, and error messages.

The memory 220 includes, for example, a program storage area and a data storage area. The memory 220 can include combinations of different types of memory or computer readable medium, such as read-only memory ("ROM") and non-volatile random access memory ("RAM"). The processor 215 is connected to the memory 220 and executes instructions stored therein. Instructions stored in the memory 220 and executed by the controller 110 may include, for example, firmware, one or more applications, filters, rules, one or more program modules, and other executable instructions. The controller 110 is configured to retrieve from memory and execute, among other things, instructions related to the control processes and methods described herein. For example, the controller 110 executes the methods illustrated in FIGS. 7 and 8 when one or more thermocouples measure a temperature in the conveyor oven 100 that is less than the temperature setpoint of the oven compartment 120. In other constructions, the controller 110 includes additional, fewer, or different components.

Figure 3:
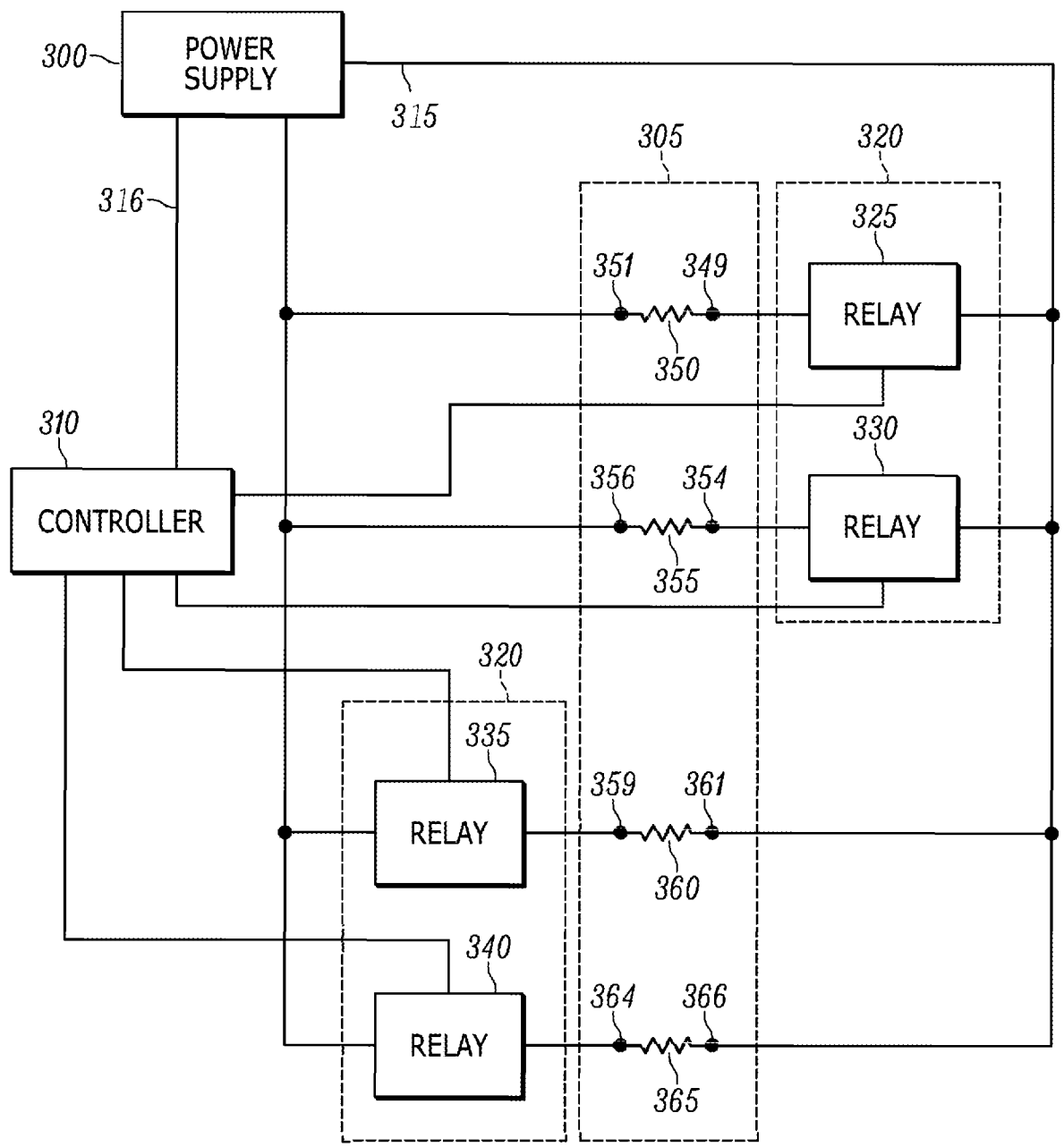
FIG. 3 is a circuit diagram of an embodiment of the conveyor oven of FIG. 1 that uses single-phase power and four heating elements.

FIG. 3 illustrates a single-phase, four-heating-element embodiment of the conveyor oven 100 of FIG. 1. A power supply 300 provides current to heating elements 305 and to a controller 310. The controller 310 includes the components of the controller 110. The power supply 300 includes an L1 line 315 and an L2 line 316. The current to the heating elements 305 is actuated by relays 320. The relays 320 include a first relay 325, a second relay 330, a third relay 335, and a fourth relay 340. The L1 line 315 connects to an input of the first relay 325 and an input of the second relay 330. The L2 line 316 connects to an input of the third relay 335 and an input of the fourth relay 340. An output of the first relay 325 connects to a first terminal 349 of the zone 1 heating element 350. A second terminal 351 of the zone 1 heating element 350 connects to the L2 line 316. Similarly, the second relay 330 connects to a first terminal 354 of the zone 2 heating element 355, and a second terminal 356 of the zone 2 heating element 355 connects to the L2 line 316. An output of the third relay 335 connects to a first terminal 359 of the zone 3 heating element 360, and a second terminal 361 of the zone 3 heating element 360 connects to L1 line 315. Similarly, an output of the fourth relay 340 connects to a first terminal 364 of the zone 4 heating element 365, and a second terminal 366 of the zone 4 heating element 365 connects to L1 line 315. The relays 320 may be solid-state relays. Alternatively, the relays 320 may be mechanical relays (e.g., contactors) or alternative forms of automated switches. It should be noted that the zone 1 heating element 350, the zone 2 heating element 355, the zone 3 heating element 360, and the zone 4 heating element 365 are collectively referred to as heating elements 305. The heating elements 305 may be grouped in the conveyor oven 100 in configurations other than in zones as described herein. In addition, the heating elements 305 may be infrared or resistive heating elements and may include multiple bulbs or coils controlled by a single relay.

The conveyor oven 100 is configured to operate with either single-phase power or three-phase power in a single-phase configuration or a three-phase configuration. When connected to single-phase power, all of the heating elements 305 and the relays 320 are connected between the line 315 and the line 316. When connected to three-phase power and configured to operate in single-phase, two phases of the three-phase power are used to supply power to the heating elements 305. When connected to three-phase power and configured to operate with three-phase power, the heating elements 305 are connected between the different phases of the three-phase power. Thus, a load evenly balanced between phases may be achieved with a conveyor oven 100 that operates on three-phase power with a multiple of three heating elements 305.

Figure 4:
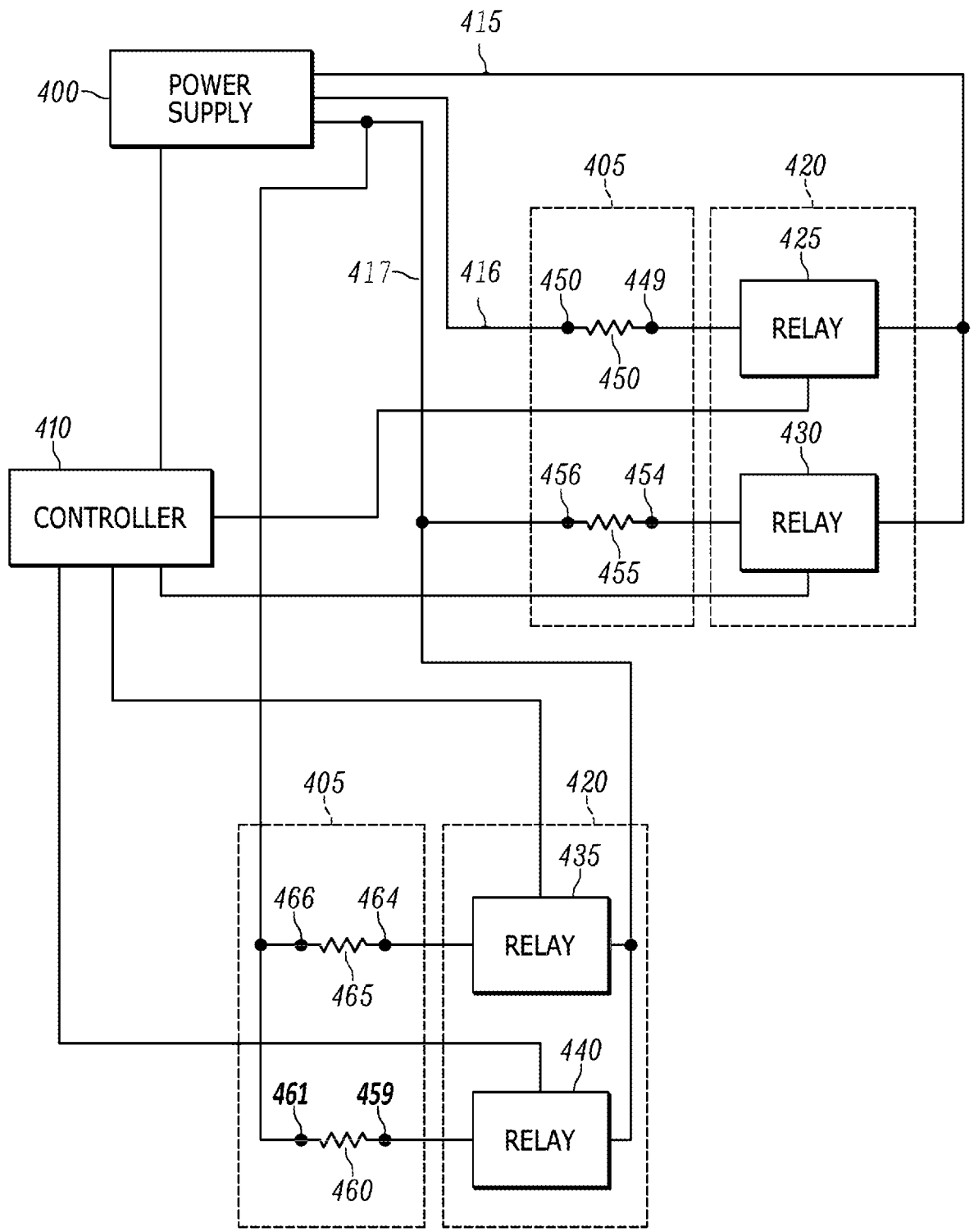
FIG. 4 is a circuit diagram of an embodiment of the conveyor oven of FIG. 1 that uses three-phase power and four heating elements.

FIG. 4 is a circuit diagram that illustrates a three-phase, four-heating-element embodiment of the conveyor oven 100. A three-phase power supply 400 is connected by three power lines, an L1 line 415 (a first phase), an L2 line 416 (a second phase), and an L3 line 417 (a third phase) to the conveyor oven 100. The L1 line 415 connects to an input of a first relay 425 and to an input of a second relay 430. An output of the first relay 425 is connected to a first terminal 449 of a zone 1 heating element 450. A second terminal 451 of the zone 1 heating element 450 is connected to the L2 line 416. An output of the second relay 430 is connected to a first terminal 454 of a zone 2 heating element 455, and the second terminal 456 of the zone 2 heating element 455 is connected to an L3 line 417. The L2 line 416 is connected to an input of a third relay 435 and to an input of a fourth relay 440. An output of the third relay 435 is connected to a first terminal 459 of a zone 3 heating element 460, and a second terminal 461 of the zone 3 heating element 460 is connected to the L3 line 417. Similarly, an output of the fourth relay 440 is connected to a first terminal 464 of a zone 4 heating element 465, and a second terminal 466 of the zone 4 heating element 465 is connected to the L3 line 417.

In the embodiment of FIG. 4, the controller 410 includes the components of the controller 110. The controller 410 is connected to relays 420 at each of the respective control inputs of the relays 420. Even though the zone 4 heating element 465 and the fourth relay 440 are illustrated across the L2 line 416 and the L3 line 416, the zone 4 heating element 465 and the fourth relay 440 may positioned across any two of the three phases. Since the zone 4 heating element 465 and the fourth relay 440 are located parallel to the zone 3 heating element 460 and are positioned across the L2 line 416 and the L3 line 417, removing the zone 4 heating element 465 may provide an evenly distributed load. Alternatively, additional heating elements and associated relays may be added to the design without departing from the scope of the invention.

Figure 5:
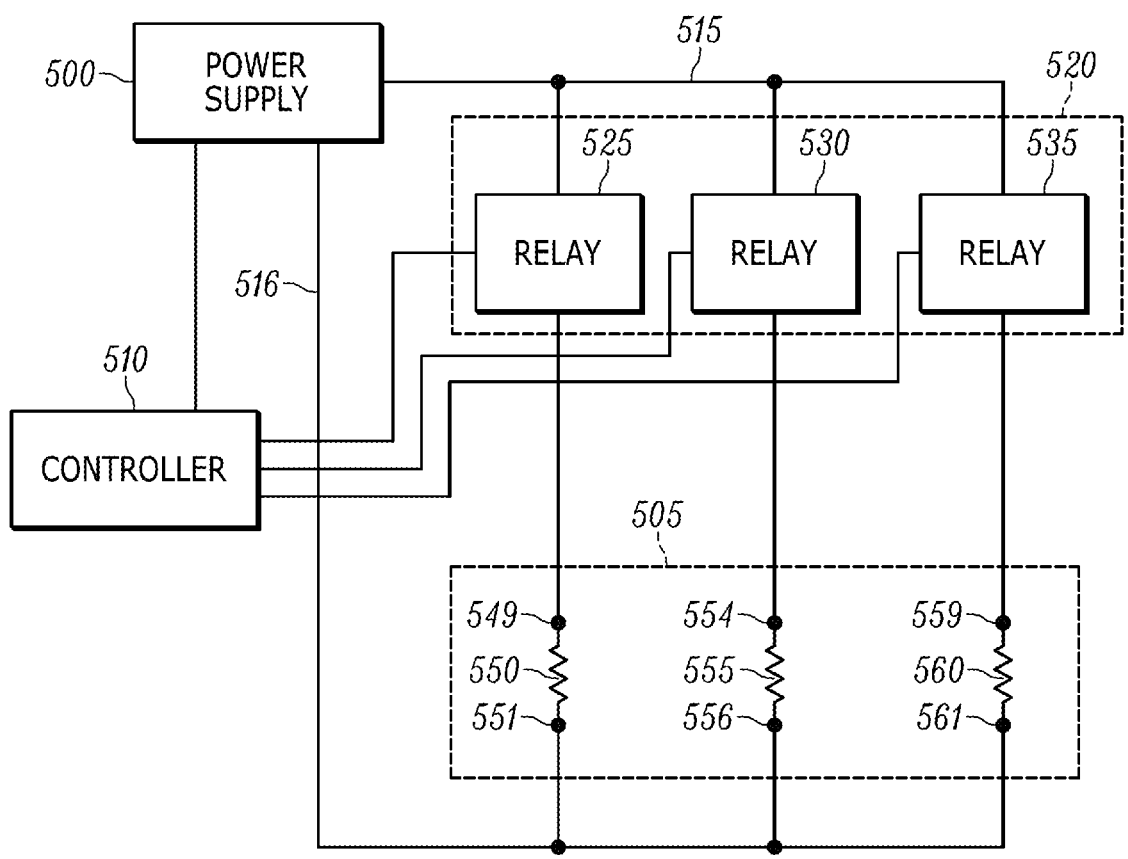
FIG. 5 is a circuit diagram of an embodiment of the conveyor oven of FIG. 1 that uses single-phase power and three heating elements.

FIG. 5 is a circuit diagram that illustrates a single-phase, three-heating-element embodiment of the conveyor oven 100. In this embodiment, heating elements 505 include a zone 1 heating element 550, a zone 2 heating element 555, and a zone 3 heating element 560. A two-phase power supply 500 is connected to an L1 line 515 and an L2 line 516. The L1 line 416 is connected to the relays 520. The relays 520 include a first relay 525, a second relay 530, and a third relay 535. An output of the first relay 525 is connected to a first terminal 549 of the zone 1 heating element 550, and a second terminal 551 of the zone 1 heating element 550 is connected to the L2 line 516. An output of the second relay 530 is connected to a first terminal 554 of the zone 2 heating element 555, and a second terminal 556 of the zone 2 heating element 555 is connected to the L2 line 516. Similarly, an output of the third relay 535 is connected to a first terminal 559 of the zone 3 heating element 560, and a second terminal 561 of the zone 3 heating element 560 is connected to the L2 line 516. The L2 line 516 provides a neutral or ground connection to the heating elements 505. A controller 510 is connected to a control input of the relays 520. As in the other embodiments, the controller 510 may include the components of the controller 110. The controller 510 actuates the relays 520 to reduce current draw in the L1 line 515.

Figure 6:
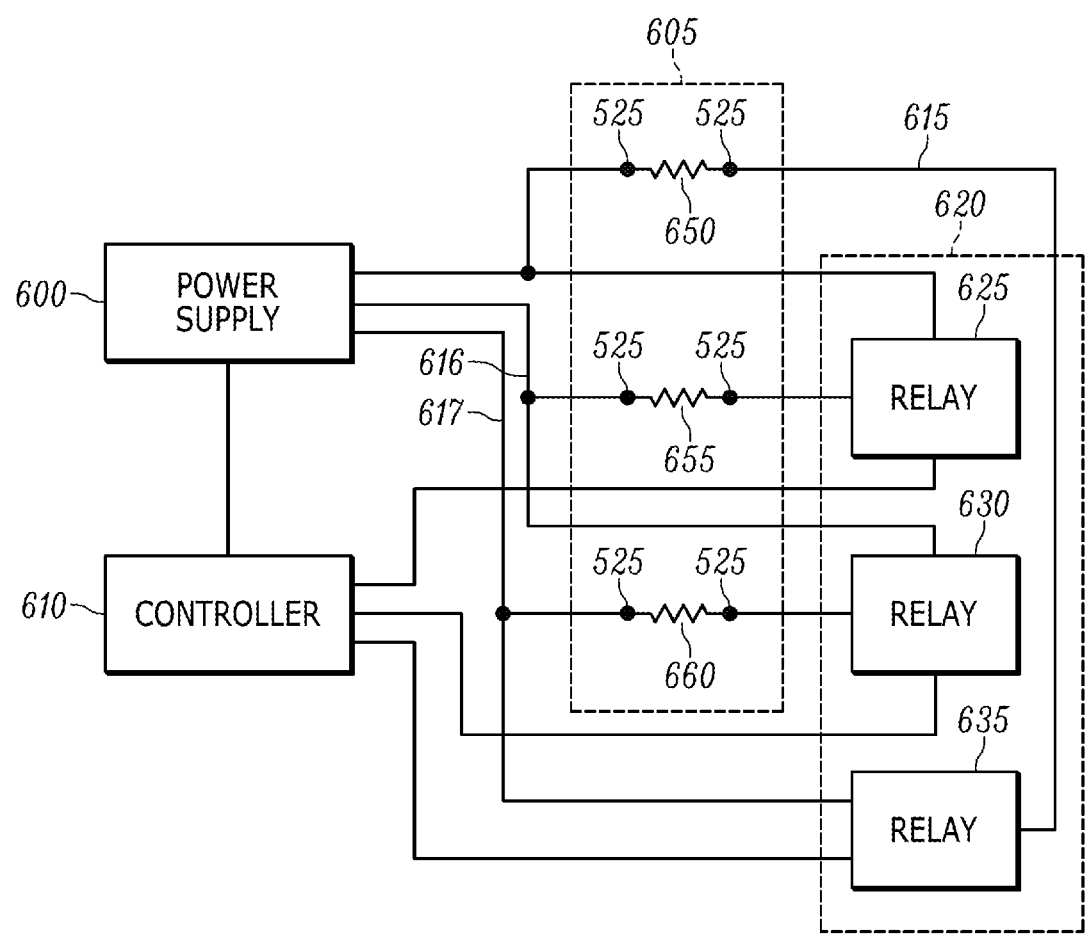
FIG. 6 is a circuit diagram of an embodiment of the conveyor oven of FIG. 1 that uses three-phase power and three heating elements.

FIG. 6 is a circuit diagram that illustrates a three-phase, three-heating element embodiment of the conveyor oven 100. A power supply 600 provides three-phase power including an L1 line 615, an L2 line 616, and an L3 line 617. The L1 line 615 is connected to an input of a first relay 625 and also a second terminal 661 of a zone 3 heating element 660. An output of the first relay 625 is connected to a first terminal 649 of a zone 1 heating element 650. A second terminal 651 of the zone 1 heating element 650 is connected to the L2 line 616. The L2 line 616 is also connected to an input of a second relay 630. An output of the second relay 630 is connected to a first terminal 654 of a zone 2 heating element 655, and a second terminal 656 of the zone 2 heating element 655 is connected to the L3 line 617. The L3 line 617 is also connected to an input of a third relay 635. An output of the third relay 635 is connected to a first terminal 659 of the zone 3 heating element 660. Relays 620 include the first relay 625, the second relay 630, the third relay 635, and the fourth relay 640. Similarly, heating elements 605 include the zone 1 heating element 650, the zone 2 heating element 655, and the zone 3 heating element 660. A controller 610 may include the components of the controller 110, and the controller 610 is connected to a control input of each of relays 620. As illustrated, the heating elements 605 are connected in a delta-load configuration. However, in other embodiments, the heating elements 605 may be connected in a Y-load configuration.

Figure 7:
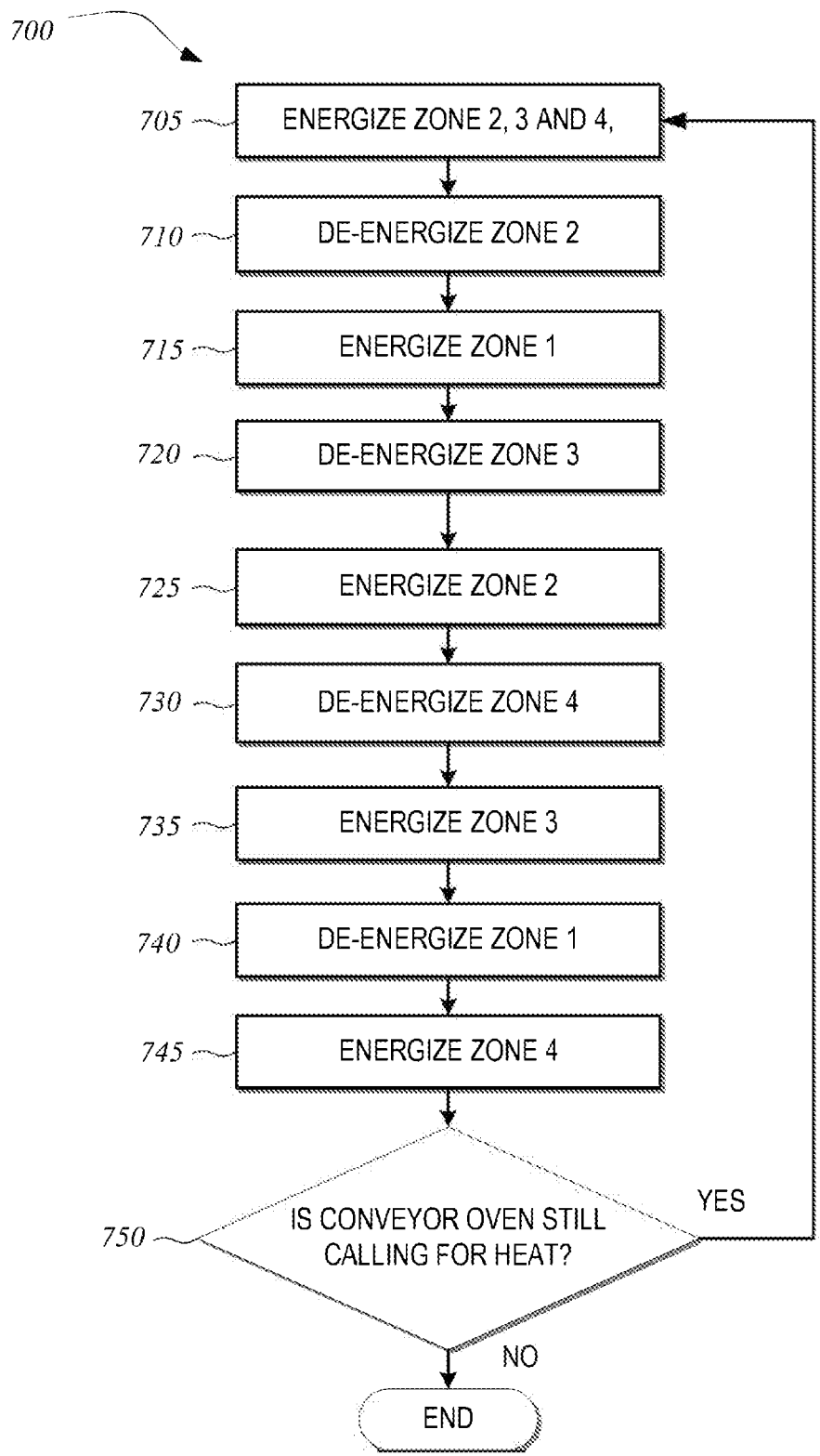
FIG. 7 is a block diagram of a heating element control method for embodiments of the conveyor oven shown in FIGS. 3 and 4.

For the embodiments of the conveyor oven 100 illustrated in FIGS. 3 and 4, the respective controller 310, 410 performs a method 700, as illustrated in FIG. 7. The method 700 reduces the total current draw of the heating elements 305, 405 during peak-loads (e.g., cold startup) of the conveyor oven 100. The method 700 is performed for embodiments of the conveyor oven 100 with four heating elements 305, 405 and four relays 320, 420. For purposes of illustration and discussion, the component numbering in the method 700 corresponds to the embodiment as illustrated in FIG. 3. However, the method 700 is also performed by the controller 410 in the embodiment of FIG. 4. The controller 310 performs the method 700 as described below.

The controller 310 actuates the second relay 330, the third relay 335, and the fourth relay 340 to energize the zone 2 heating element 355, the zone 3 heating element 360, and the zone 4 heating element 365 for a first period of time (e.g., 1 second) (step 705). The zone 1 heating element 350 is de-energized during this step. After the first period of time, the controller 310 actuates the second relay 330 to de-energize the zone 2 heating element 355 for a second period of time (e.g., 20 ms) (step 710). After the second period of time, the controller 310 actuates the first relay 325 to energize the zone 1 heating element 350 (step 715). After a third period of time, the controller 310 actuates the third relay 335 to de-energize the zone 3 heating element 360 for a fourth period of time (step 720). Next, the controller 310 actuates the second relay 330 to energize the zone 2 heating element for a fifth period of time (step 725). After the fifth period of time, the controller 310 actuates the fourth relay 340 to de-energize the zone 4 heating element 365 for a sixth period of time (step 730). The controller 310 actuates the third relay 335 to energize the zone 3 heating element 360 for a seventh period of time (step 735). The controller 310 actuates the first relay 325 to de-energize the zone 1 heating element 350 for an eighth period of time (step 740). After the eighth period of time, the controller 310 actuates the fourth relay 340 to energize the zone 4 heating element 365 (step 745). Once the fourth relay 340 is actuated, the position of the relays 320 corresponds to a state that is the same as in step 705. If the desired temperature has not been reached, the method 700 then repeats steps 710-745 until the desire temperature has been met (step 750). Step 750 is illustrated at the end of one heating cycle. However, step 750 may be performed at any point during the cycle. Once the controller 310 receives a signal indicative of adequate temperature in the conveyor oven 100, the controller 310 may immediately halt the method 700, may halt the method 700 after step 750, or halt the method 700 after a preprogrammed time delay.

In the method 700, the first, third, fifth, and seventh periods of time may be set to the same predetermined value. Similarly, the second, fourth, sixth, and eighth periods of time may also be set to an equal value. The first, third, fifth, and seventh periods of time correspond to the time when three of the heating elements 305 are energized. The second, fourth, sixth, and eighth periods of time correspond to the time when the controller 310 is actively switching the relays 320. Accordingly, the second, fourth, sixth, and eighth periods of time are set to a shorter period of time (e.g., one-tenth) than that of the first, third, fifth, and seventh periods of time. The second, fourth, sixth, and eighth periods of time ensure that the heating elements 305 are not energized simultaneously.

Figure 8:
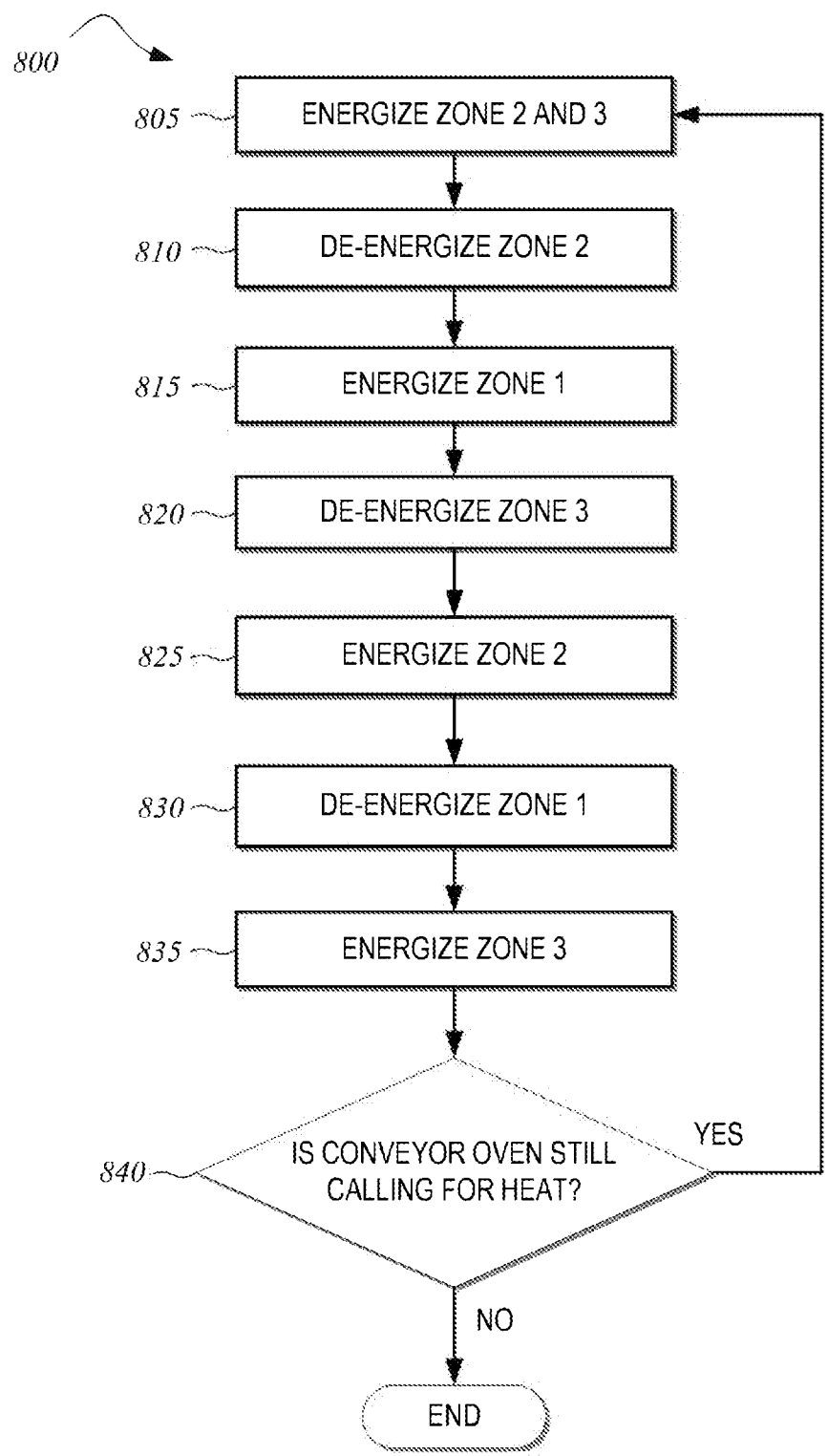
FIG. 8 is a block diagram of a heating element control method for embodiments of the conveyor oven shown in FIGS. 5 and 6.

For the embodiments of the conveyor oven 100 illustrated in FIGS. 5 and 6, the respective controller 510, 610 performs a method 800, as illustrated in FIG. 8. The method 800 is performed on the embodiments of the conveyor oven 100 with three heating elements 505, 605. As in the method 700, the method 800 is used for both single-phase and three-phase power configurations. For purposes of illustration and description, the method 800 is described in reference to FIG. 5. However, the method 800 is also performed for the embodiment illustrated in FIG. 6.

The controller 510 actuates the second relay 530 and the third relay 535 to energize the zone 2 heating element 555 and the zone 3 heating element 560 (step 805). The first relay 525 remains open. After a first period of time (e.g., 1 second), the controller 510 actuates the second relay 530 to de-energize the zone 2 heating element 555 (step 810). At step 810, the zone 3 heating element 560 is the only heating element 550, 555, 560 that is energized. After a second period of time (e.g., 20 ms), the controller 510 actuates the first relay 525 to energize the zone 1 heating element 550 (step 815). After a third period of time, the controller 310 actuates the third relay 535 to de-energize the zone 3 heating element 560 (step 820). After a fourth period of time, the controller 510 actuates the second relay 530 to energize the zone 2 heating element 555 (step 825). After a fifth period of time, the controller 510 actuates the first relay 525 to de-energize the zone 1 heating element 550 (step 830). After a sixth period of time, the controller 510 actuates the third relay 535 to energize the zone 3 heating element 560 (step 835). After the third relay 535 closes, the position of the relays 520 is identical to step 805, and the method 800 repeats if the conveyor oven 100 is still requesting heat (step 840). The controller 510 cycles through the steps 810 through 835 until the call for heat of the conveyor oven 100 is finished. Step 840 is illustrated at the end of one heating cycle. However, step 840 may be performed at any point during the cycle. Once the controller 510 receives a signal indicative of adequate temperature in the conveyor oven 100, the controller 510 may immediately halt the method 800, may halt the method 800 at step 840, or halt the method 800 after a preprogrammed time delay.

Figure 9:
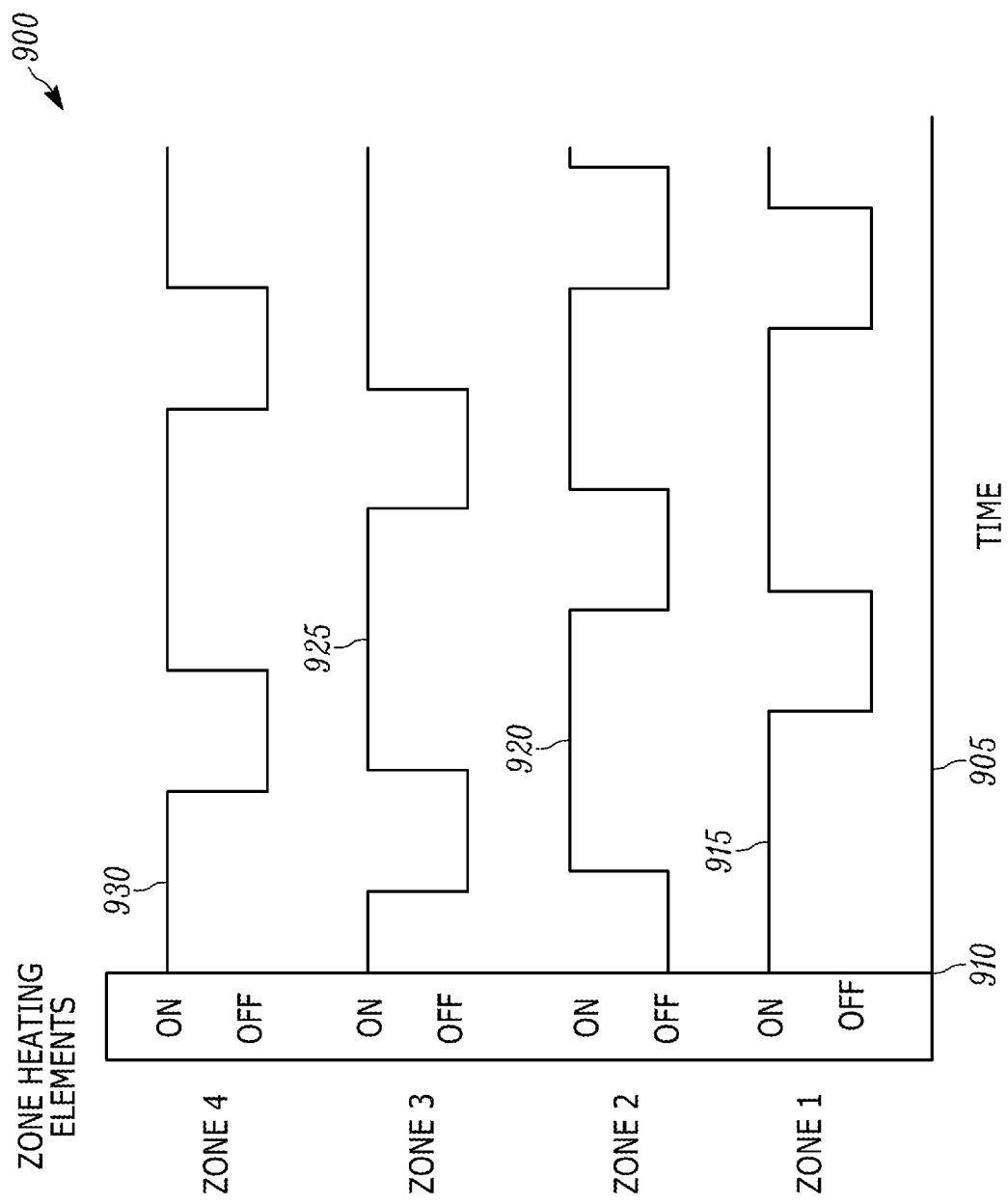
FIG. 9 is a graph illustrating a timing sequence for actuation of relays for the method of FIG. 7.

FIG. 9 is a graph 900 illustrating the energization state of the heating elements 305 for the method 700. The graph 900 includes an x-axis 905 corresponding to time and a y-axis 910 corresponding to a number representing each of the heating elements 305. For each of the heating elements 305, an energized or de-energized state is charted over time. The zone 1 heating element 350 is represented by line 915, the zone 2 heating element 355 is represented by line 920, the zone 3 heating element 360 is represented by line 925, and the zone 4 heating element 360 is represented by line 930. Each line 915, 920, 925, and 930 is labeled with a respective zone number. When each line 915, 920, 925, and 930 is in an upper position, each corresponding heating element 350, 355, 360, and 365 is energized. When each line 915, 920, 925, and 930 is in a lower position, each corresponding heating element 350, 355, 360, and 365 is de-energized. The graph 900 illustrates how the energization state of each of the heating elements 350, 355, 360, and 365 relate to each other. The graph 900 illustrates one and one-half cycles, and the pattern illustrated by the graph 900 repeats as the method 700 repeats.

As illustrated by each previously described method 700, 800, the controller 310, 410 actuates the relays 320, 420 to limit the maximum time that each of the heating elements 305, 405 are energized. In FIG. 9, each of the heating elements 305 is energized in a duty cycle of 70% on and 30% off. The on/off cycles are distributed in time by the controller 310 to ensure that at most three of the heating elements 305 are energized at any given time and that at least two heating elements of the heating elements 305 are energized at any given time. This cycling reduces average current draw by each of the heating elements 305. For example, the zone 1 heating element 350 is energized for 70% of a cycle. Therefore, 70% of the time the zone 1 heating element 350 draws full current while 30% of the time the zone 1 heating element 350 draws no current. This achieves an average current draw and power usage for each of the heating elements 305 less than the maximum current draw available.

It should be noted that the controller 310, 410, 510, and 610 is adjustable to modify the duty cycles. In a four-heating-element configuration, as shown in FIGS. 3 and 4, the controller 310, 410 actuates each of the relays 320, 420 at less than three-fourths of continuous operation. The controller 310, 410 can alter the duty cycle to range between one-half and three-fourths of a full cycle. Ideally, the controller 310, 410 will set the duty cycle near to the three-fourths duty cycle (e.g., 70% duty cycle). At this duty cycle, not all of the heating elements 305, 405 will be active at any given time. A 70% duty cycle ensures a margin of safety corresponding to the second, fourth, sixth, and eighth times in the method 700. The margin of safety ensures that the total current draw of the conveyor oven 100 is less than its potential continuous amperage draw during peak-times of the conveyor oven 100. At no point in time are four of the heating elements 305, 405 energized.

In a three-heating element configuration, as shown in FIGS. 5 and 6, the controller 510, 610 actuates the relays 520, 620 such that energization of the heating elements 505, 605 gives a maximum current draw of two-thirds continuous operation. Generally, the controller 510,610 actuates each of the relays 520, 620 at less than two-thirds of continuous operation to allow each of the relays 520, 620 time to actuate. The duty cycles for each of the heating elements 505, 605 are adjustable from a range of two-thirds to one-third of continuous operation. At a two-thirds duty cycle, two of the heating elements 505, 605 are energized while one of the heating elements 505, 605 is de-energized. At a one-third duty cycle, one of the heating elements 505, 605 is energized while the other two heating elements 505, 605 are de-energized. Ideally, the controller 510, 610 actuates the heating elements 505, 605 closer to the two-thirds duty cycle (e.g., 60% duty cycle) with a margin of safety to ensure that at no point in time are three of the heating elements 505, 605 energized at the same time. This ensures that the average current draw will be, at maximum, two-thirds of the continuous current draw.

Thus, embodiments of the invention provide, among other things, a conveyor oven and a method for controlling the conveyor oven such that the current draw to the heating elements is reduced during peak-loads. Various features and advantages of the invention are set forth in the following claims.

What is claimed is:

1. A conveyor oven comprising:
   an oven compartment;
   a conveyor extending through the oven compartment;
   a motor that drives the conveyor;
   a first heating element,
   a first relay that controls a current flow to the first heating element;
   a second heating element,
   a second relay that controls a current flow to the second heating element;
   a third heating element,
   a third relay that controls a current flow to the third heating element;
   a power supply that receives external power and distributes power to the first heating element, the second heating element, and the third heating element; and
   an electronic controller electrically coupled to the power supply and to the first relay, the second relay, and the third relay, the electronic controller configured to:
   execute a set of predetermined operations when a measured temperature in the oven compartment is less than a user adjustable temperature setpoint,
   repeat the set of predetermined operations until the electronic controller receives a signal indicating that the measured temperature is equal to or greater than the user adjustable temperature setpoint, and
   cease the set of predetermined operations upon receipt by the electronic controller of the signal indicating that the measured temperature is equal to or greater than the user adjustable temperature setpoint;
   wherein the set of predetermined operations includes:
   actuating the second relay and the third relay to energize the second heating element and the third heating element for a first predetermined period of time while the first heating element is de-energized during the first predetermined period of time,
   actuating the second rely after the first predetermined period of time to de-energize the second heating element,
   actuating the first relay after a second predetermined period of time to energize the first heating element,
   actuating the third rely after a third predetermined period of time to de-energize the third heating element,
   actuating the second relay after a fourth predetermined period of time to energize the second heating element,
   actuating the first rely after a fifth predetermined period of time to de-energize the first heating element, and
   actuating the third relay after a sixth predetermined period of time to energize the third heating element;
   wherein the first predetermined period of time, the third predetermined period of time, and the fifth predetermined period of time are equal to one another and each are longer than the second predetermined period of time, the fourth predetermined period of time, and the sixth predetermined period of time, respectively, such that no more than three heating elements are energized simultaneously at any given time.

2. The conveyor oven of claim 1, wherein
   the second predetermined period of time, the fourth predetermined period of time, and the sixth predetermined period of time are equal, and
   the first predetermined period of time, the second predetermined period of time, the third predetermined period of time, the fourth predetermined period of time, the fifth predetermined period of time, and the sixth predetermined period of time cumulatively constitute one cycle, the one cycle continuously repeating during heating of the oven compartment.

3. The conveyor oven of claim 1, wherein the electronic controller is configured to limit the maximum amount of time each of the first heating element, the second heating element, and the third heating element is energized during the set of predetermined operations.

4. The conveyor oven of claim 1, wherein the electronic controller is configured to limit the current draw of each of the first heating element, the second heating element, and the third heating element during the set of predetermined operations such that the total current draw of the first heating element, the second heating element, and the third heating element is less than a maximum current draw available.

5. The conveyor oven of claim 1, wherein the electronic controller is configured to selectively actuate the first relay, the second relay, and the third relay to energize, respectively, the first heating element, the second heating element, and the third heating element in a predetermined 70% on and 30% off duty cycle during the set of predetermined operations.

6. The conveyor oven of claim 1, wherein the electronic controller is configured to selectively actuate the first relay, the second relay, and the third relay such that energization of the first heating element, the second heating element, and the third heating element gives a total maximum current draw of two-thirds continuous operation during the set of predetermined operations.

7. The conveyor oven of claim 1, wherein the electronic controller is configured to selectively actuate the first relay, the second relay, and the third relay such that energization of the first heating element, the second heating element, and the third heating element gives a total maximum current draw in the range of two-thirds to one-third continuous operation during the set of predetermined operations.

8. The conveyor oven of claim 1, wherein the power supply is a single-phase power supply.

9. The conveyor oven of claim 1, wherein the power supply is a three-phase power supply.

10. The conveyor oven of claim 9, wherein the a power supply distributes power to the first heating element, the second heating element, and the third heating element by providing a first phase to the first heating element, a second phase to the second heating element, and a third phase to the third heating element.

11. A system for controlling a conveyor oven, the system comprising:
an electronic controller electrically coupled to a power supply and to a first relay, a second relay, and a third relay;
wherein the electronic controller is configured to:
execute a set of predetermined operations when a measured temperature is less than a user adjustable temperature setpoint, and
repeat the predetermined set of operations until the measured temperature is equal to or greater than the user adjustable temperature setpoint,
wherein the set of predetermined operations includes:
actuating the second relay and the third relay to energize a second heating element and a third heating element for a first predetermined period of time while a first heating element is de-energized during the first predetermined period of time,
actuating the second rely after the first predetermined period of time to de-energize the second heating element,
actuating the first relay after a second predetermined period of time to energize the first heating element,
actuating the third rely after a third predetermined period of time to de-energize the third heating element,
actuating the second relay after a fourth predetermined period of time to energize the second heating element,
actuating the first rely after a fifth predetermined period of time to de-energize the first heating element, and
actuating the third relay after a sixth predetermined period of time to energize the third heating element,
wherein the first predetermined period of time, the third predetermined period of time, and the fifth predetermined period of time are equal to one another and each are longer than the second predetermined period of time, the fourth predetermined period of time, and the sixth predetermined period of time, respectively, such that no more than three heating elements are energized simultaneously at any given time.

12. The system of claim 11, wherein
the second predetermined period of time, the fourth predetermined period of time, and the sixth predetermined period of time are equal, and
the first predetermined period of time, the second predetermined period of time, the third predetermined period of time, the fourth predetermined period of time, the fifth predetermined period of time, and the sixth predetermined period of time cumulatively constitute one cycle, the one cycle continuously repeating during heating.

13. The system of claim 11, wherein the electronic controller is configured to limit the maximum amount of time each of the first heating element, the second heating element, and the third heating element is energized during the set of predetermined operations.

14. The system of claim 11, wherein the electronic controller is configured to limit the current draw of each of the first heating element, the second heating element, and the third heating element during the operations such that the set of predetermined total current draw of the first heating element, the second heating element, and the third heating element is less than a maximum current draw available.

15. The system of claim 11, wherein the electronic controller is configured to selectively actuate the first relay, the second relay, and the third relay to energize, respectively, the first heating element, the second heating element, and the third heating element in a predetermined 70% on and 30% off duty cycle during the set of predetermined operations.

16. The system of claim 11, wherein the electronic controller is configured to selectively actuate the first relay, the second relay, and the third relay such that energization of the first heating element, the second heating element, and the third heating element gives a total maximum current draw of two-thirds continuous operation during the set of predetermined operations.

17. The system of claim 11, wherein the electronic controller is configured to selectively actuate the first relay, the second relay, and the third relay such that energization of the first heating element, the second heating element, and the third heating element gives a total maximum current draw in the range of two-thirds to one-third continuous operation during the set of predetermined operations.

18. A non-transitory computer-readable medium including instructions executable by an electronic controller to perform a set of functions, the set of functions comprising:
executing a set of predetermined operations when a measured temperature is less than a user adjustable temperature setpoint, and
repeating the set of predetermined operations until the measured temperature is equal to or greater than the user adjustable temperature setpoint,
wherein the set of predetermined operations includes:
actuating a second relay and a third relay to energize a second heating element and a third heating element for a first predetermined period of time while a first heating element is de-energized during the first predetermined period of time,
actuating the second rely after the first predetermined period of time to de-energize the second heating element,
actuating a first relay after a second predetermined period of time to energize the first heating element,
actuating the third rely after a third predetermined period of time to de-energize the third heating element,
actuating the second relay after a fourth predetermined period of time to energize the second heating element,
actuating the first rely after a fifth predetermined period of time to de-energize the first heating element, and
actuating the third relay after a sixth predetermined period of time to energize the third heating element,
wherein the first predetermined period of time, the third predetermined period of time, and the fifth predetermined period of time are equal to one another and each are longer than the second predetermined period of time, the fourth predetermined period of time, and the sixth predetermined period of time, respectively, such that no more than three heating elements are energized simultaneously at any given time.

19. The non-transitory computer-readable medium of claim 18, wherein:
- the second predetermined period of time, the fourth predetermined period of time, and the sixth predetermined period of time are equal,
- the first predetermined period of time, the second predetermined period of time, the third predetermined period of time, the fourth predetermined period of time, the fifth predetermined period of time, and the sixth predetermined period of time cumulatively constitute one cycle; and
- wherein the instructions further comprises continuously repeating the one cycle during heating of the oven compartment.

20. The non-transitory computer-readable medium of claim 18, wherein the set of instructions further comprises:
- selectively actuating the first relay, the second relay, and the third relay to energize, respectively, the first heating element, the second heating element, and the third heating element in a predetermined 70% on and 30% off duty cycle during the set of predetermined operations.

\* \* \* \* \*